United States Patent
Lin et al.

(10) Patent No.: US 12,309,742 B2
(45) Date of Patent: May 20, 2025

(54) MUSIM IMSI OFFSET VALUE HANDLING FOR PAGING TIMING COLLISION CONTROL

(71) Applicant: MEDIATEK INC., Hsin-Chu (TW)

(72) Inventors: Yuan-Chieh Lin, Hsin-Chu (TW);
Yu-Chieh Tien, Hsin-Chu (TW);
Pan-Yen Chiang, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 344 days.

(21) Appl. No.: 17/848,281

(22) Filed: Jun. 23, 2022

(65) Prior Publication Data
US 2023/0034780 A1  Feb. 2, 2023

Related U.S. Application Data

(60) Provisional application No. 63/226,799, filed on Jul. 29, 2021.

(51) Int. Cl.
*H04W 68/00* (2009.01)
*H04W 8/08* (2009.01)

(52) U.S. Cl.
CPC ............ *H04W 68/00* (2013.01); *H04W 8/08* (2013.01)

(58) Field of Classification Search
CPC ..... H04W 60/04; H04W 68/00; H04W 68/02; H04W 8/08; H04W 8/18
See application file for complete search history.

(56) References Cited

U.S. PATENT DOCUMENTS

| 11,917,580 B2* | 2/2024 | Chun ............... H04W 8/183 |
| 2011/0294523 A1 | 12/2011 | Ai et al. ............. H04W 68/00 |
| 2019/0104390 A1* | 4/2019 | Lee .................. H04W 64/003 |
| 2020/0037243 A1* | 1/2020 | Tamura ............ H04W 52/0216 |
| 2023/0096752 A1* | 3/2023 | Gupta .................. H04W 60/04 |
| | | 370/329 |

(Continued)

FOREIGN PATENT DOCUMENTS

| CN | 101778371 A | 1/2009 |
| WO | WO2021128162 A1 | 12/2019 |

OTHER PUBLICATIONS

Taiwan IPO, office action for the Taiwanese patent application 111128473 (no English translation is available), dated Dec. 9, 2022 (9 pages).

(Continued)

*Primary Examiner* — Timothy X Pham
(74) *Attorney, Agent, or Firm* — Helen Mao; Zheng Jin; Imperium Patent Works

(57) ABSTRACT

A method of handling (alternative) IMSI value for MUSIM UEs supporting paging timing collision control in an EPS network is proposed. For a MUSIM UE and EPS supporting paging timing collision control, the MUSIM UE and the network can request and negotiate an IMSI offset for the IMSI value on one of the USIM card through a TAU or ATTACH procedure. When lower layer failure occurs, the network may not successfully receive a TRACKING AREA UPDATE COMPLETE (or ATTACH COMPLETE) message from the UE, and therefore the network may not know which IMSI value UE will use. Accordingly, the network needs to use both possible (alternative) IMSI values when deriving paging timing for the UE until one of the (alternative) IMSI values is considered invalid.

20 Claims, 5 Drawing Sheets

(56) References Cited

U.S. PATENT DOCUMENTS

2023/0403678 A1* 12/2023 Shrivastava .......... H04W 68/12

OTHER PUBLICATIONS

Europe IPO, search report for the European patent application 22187878.8, dated Dec. 16, 2022 (14 pages).
R2-2104970, Asia Pacific Telecom, FGI, "Paging collision avoidance for MUSIM device", 3GPP TSG RAN WG2 #1114-e, section 2.1, dated May 10-27, 2021 (2 pages).
DRAFT_24301-H30, "3rd Generation Partnership Project; Technical Specification Group Core Network and Terminals; Non-Access-Stratum (NAS) protocol for Evolved Packet System (EPS); Stage 3 (Release 17)", pp. 81-82, 86, 153-184, dated Jun. 2021. (File Size Too Big, not uploaded).
S2-2102897, Vodafone, "Function Description for Multi-USIM devices—TAU rate limit", 3GPP TSG-SA2 Meeting #144E, section 4.3.x.5, dated Apr. 12-16, 2021 (4 pages).
ETSI TS 124 301 V17.7.0, "Universal Mobile Telecommunications System (UMTS); LTE; 5G; Non-Access-Stratum (NAS) protocol for Evolved Packet System (EPS); Stage 3 (3GPP TS 24.301 version 17.7.0 Release 17)", section 5.5.3.2.7, dated Jul. 2022 (612 pages). (File Size Too Big, not uploaded).
C1-225179, Apple, "Abnormal cases in TAU procedure for handling WUS assistance information", 3GPP TSG-CT WG1 Meeting #137-e, dated Aug. 18-26, 2022 (16 pages).

* cited by examiner

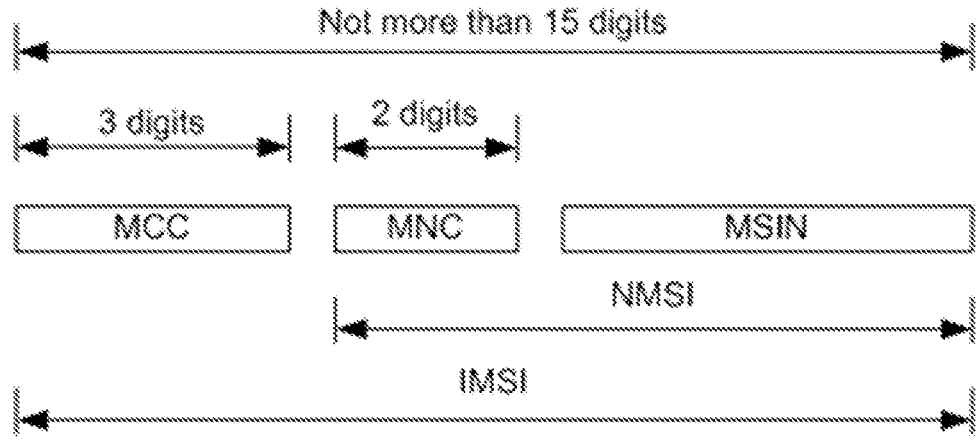

Alternative IMSI value =
[MCC] [MNC] [(MSIN value + Accepted IMSI Offset) mod (MSIN address space)]

FIG. 3

CASE #1:

BEFORE TAU: A NEGOTIATED IMSI OFFSET VALUE #1-2

AFTER TAU: A NEGOTIATED IMSI OFFSET VALUE #1-1  ?

CASE #2:

BEFORE TAU: A NEGOTIATED IMSI OFFSET VALUE #2-1

AFTER TAU: NO NEGOTIATED IMSI OFFSET ASSIGNED 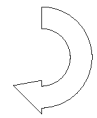 ?

CASE #3:

BEFORE TAU: NO NEGOTIATED IMSI OFFSET ASSIGNED

AFTER TAU: A NEGOTIATED IMSI OFFSET VALUE #3-1  ?

FIG. 4

MUSIM IMSI OFFSET VALUE HANDLING FOR PAGING TIMING COLLISION CONTROL

CROSS REFERENCE TO RELATED APPLICATION

This application claims priority under 35 U.S.C. § 119 from U.S. Provisional Application No. 63/226,799 entitled "MUSIM Negotiated IMSI offset assigned and lower layer failure before ATTACH or TAU COMPLETE is received by network," filed on Jul. 29, 2021, the subject matter of which is incorporated herein by reference.

TECHNICAL FIELD

The disclosed embodiments relate generally to wireless communication systems, and, more particularly, to handling alternative International Mobile Subscriber Identity (IMSI) value for Multiple USIM (MUSIM) UEs that support paging timing collision control in EPS network.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (e.g., eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board has decided to focus the future NGMN activities on defining the end-to-end requirements for 5G new radio (NR) systems. The base stations in 5G NR systems are referred to as Next Generation Node-Bs (e.g., gNodeBs or gNBs).

Non-access stratum (NAS) is used to convey non-radio signalling between UE and the Mobility Management Entity (MME) or the Access and Mobility Management Function (AMF) for an LTE/NR access. A NAS signaling connection can be established via an Attach procedure in 4G/LTE or via a registration procedure in 5G/NR, involving UE subscription and identity. The universal subscriber identity module (USIM) is one of several software applications that resides in the UE, called the universal integrated circuit card (UICC). As smartphones and services became more affordable, their users have tended to use different mobile subscriptions (i.e., USIM cards) for travel, business, and personal needs. Many UEs now support multiple USIM cards (MUSIM) for registration and operation over different USIM simultaneously. An International Mobile Subscriber Identity (IMSI) is used in any mobile network that interconnects with other networks. This unique, 15-digit international identifier, which is included in a mobile device, allows for roaming on mobile service provider networks. The IMSI is stored in the UICC and can be accessed through USIM application.

In 4G paging, the timing (e.g., paging occasion) is determined based on IMSI, and UE monitors paging on "paging occasions" derived from the IMSI. For a MUSIM UE, however, it is possible that the paging occasions for the multiple USIM cards are the same. As a result, the MUSIM UE will not be able to monitor paging for both USIM cards if the MUSIM UE has only one set of radio frequency (RF) module. To solve this problem, a feature that supports "paging timing collision control" is introduced. The MUSIM UE and the network can request and negotiate an "IMSI offset" for the IMSI value on one of the USIM card through a TAU or ATTACH procedure, so that the paging occasion for that USIM card can be different from the paging occasion for the other USIM card of the same MUSIM UE. If the UE has assigned an accepted "IMSI Offset" value, the UE use "alternative IMSI value" to derive the paging occasion. The "alternative IMSI value" is derived from the "IMSI value" and the "alternative IMSI value". If the UE does not have assigned an accepted "IMSI Offset" value, the UE use "IMSI" value to derive the paging occasion).

However, if a lower layer failure occurs before the message TRACKING AREA UPDATE COMPLETE (or ATTACH COMPLETE) is successfully received by the network, then the network does not know whether the UE will monitor paging use the "paging occasions" derived from previous (alternative) IMSI value before the ATTACH/TAU procedure, or the "paging occasions" derived from the (alternative) IMSI value after the ATTACH/TAU procedure.

A solution is sought.

SUMMARY

A method of handling (alternative) IMSI value for MUSIM UEs supporting paging timing collision control in an EPS network is proposed. For a MUSIM UE and EPS supporting paging timing collision control, the MUSIM UE and the network can request and negotiate an "IMSI offset" for the IMSI value on one of the USIM card through a TAU or ATTACH procedure, so that the paging occasion for that USIM card can be different from the paging occasion for the other USIM card of the same MUSIM UE. If the UE has assigned an accepted "IMSI Offset" value, the UE use "alternative IMSI value" to derive the paging occasion. The "alternative IMSI value" is derived from the "IMSI value" and the "alternative IMSI value". If the UE does not have assigned an accepted "IMSI Offset" value, the UE use "IMSI" value to derive the paging occasion. When lower layer failure occurs, the network may not successfully receive a TRACKING AREA UPDATE COMPLETE (or ATTACH COMPLETE) message from the UE, and does not know which (alternative) IMSI value UE will use to derive the paging occasion. Accordingly, the network needs to use both possible (alternative) IMSI values when deriving paging timing for the UE until one of the (alternative) IMSI values is considered invalid.

In one embodiment, a network entity receives a TRACKING AREA UPDATE (TAU) REQUEST message from a user equipment (UE) in a wireless communication network. The UE supports multiple universal subscriber identity module (MUSIM). The network entity determines whether the TAU REQUEST message comprises a UE-requested IMSI offset value for a USIM card. The network entity transmits a TRACKING AREA UPDATE ACCEPT message to the UE. The TAU ACCEPT message comprises an accepted IMSI offset value or no IMSI offset value for the USIM card in response to the TAU REQUEST message. The network entity determines two paging timings (paging occasions) using both a previous (alternative) IMSI value and an updated (alternative) IMSI value of the USIM card when the network does not receive a TRACKING AREA UPDATE COMPLETE message from the UE. The network entity pages the UE using the determined paging timings.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates one example of the content of an International Mobile Subscriber Identity (IMSI) that can be used to derive paging occasion.

FIG. 4 illustrates different cases where the UE and the network using a TAU/ATTACH procedure to request and negotiate IMSI offset values.

DETAILED DESCRIPTION

Reference will now be made in detail to some embodiments of the invention, examples of which are illustrated in the accompanying drawings.

Figure 1:
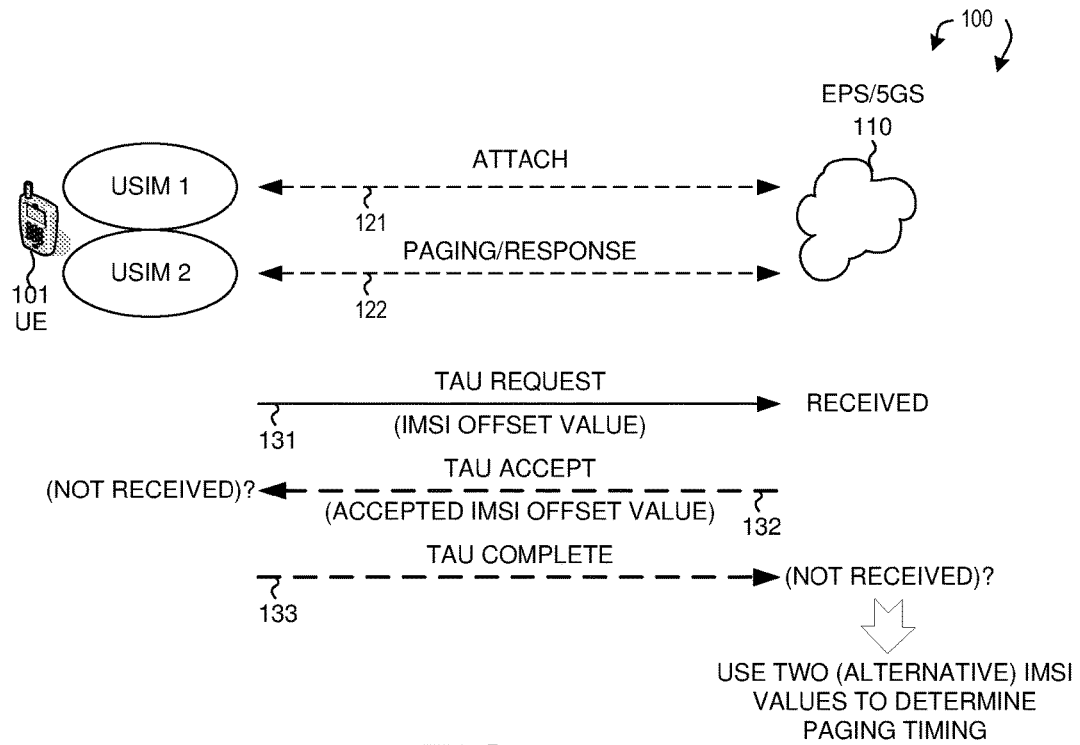
FIG. 1 illustrates a user equipment (UE) and an evolved packet system (EPS) or 5GS network handling IMSI value for Multiple USIM (MUSIM) UEs that support paging timing collision control feature in accordance with one novel aspect.

FIG. 1 illustrates a user equipment (UE) and an evolved packet system (EPS) or 5GS network handling IMSI value for Multiple USIM (MUSIM) UEs that support paging timing collision control feature in accordance with one novel aspect. In 3GPP network, a plurality of base stations, e.g., Next Generation Node-Bs (gNBs) or eNode-Bs (eNBs), communicating with a plurality of mobile stations referred as user equipment (UEs). Orthogonal Frequency Division Multiple Access (OFDMA) has been selected for downlink (DL) radio access scheme due to its robustness to multipath fading, higher spectral efficiency, and bandwidth scalability. Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH. On the other hand, a Non-Access Stratum (NAS) layer connection is used to convey non-radio signaling between UE and the Mobility Management Entity (MME) or the Access and Mobility Management Function (AMF) for access.

In FIG. 1, UE 101 supports multiple universal subscriber identity module (MUSIM) for attach/registration and operation with EPC/5GC 110 over different USIM cards simultaneously. The two or more different USIMs can register to same EPS, same 5GS, different EPSs, different 5GSs, or one or more EPS and one or more 5GS, or even network(s) which is neither EPS nor 5GS. In 4G paging, the timing (e.g., paging occasion) is determined based on IMSI, and UE monitors paging on paging occasions derived from the IMSI. For a MUSIM UE, however, it is possible that the paging occasions for the multiple USIM cards are the same. As a result, the MUSIM UE will not be able to monitor paging for both USIM cards if the MUSIM UE has only one set of radio frequency (RF) module. To solve this problem, a feature that supports "paging timing collision control" is introduced. The MUSIM UE and the network can request and negotiate an "IMSI offset" for the IMSI value on one of the USIM card through a TAU or ATTACH procedure, so that the paging occasion for that USIM card can be different from the paging occasion for the other USIM card of the same MUSIM UE (If the UE has assigned an accepted "IMSI Offset" value, the UE use "alternative IMSI value" to derive the paging occasion. The "alternative IMSI value" is derived from the "IMSI value" and the "alternative IMSI value". If the UE does not have assigned an accepted "IMSI Offset" value, the UE use "IMSI" value to derive the paging occasion).

In the example of FIG. 1, in step 121, UE 101 performs ATTACH procedure with EPS 110 on both USIM1 and USIM2 (USIM1 and USIM2 can attach to same or different PLMN). In step 122, UE 101 monitors and responses to paging from EPS 110 on both USIM1 and USIM2. However, UE 101 discovers that the paging occasions for USIM1 and USIM2 are the same and needs to indicate an IMSI offset value to the network for one of the USIM, e.g., USIM1, via a TAU procedure. In step 131, UE 101 includes the IMSI offset value in a "requested IMSI offset" IE in a TAU REQUEST message and send to the network. In step 132, the network includes a "negotiated IMSI offset" IE in a TAU ACCEPT message and send to UE 101. In step 133, UE 101 sends a TAU COMPLETE message to the network to acknowledge the received "negotiated IMSI offset" IE.

However, if a lower layer failure occurs before the message TRACKING AREA UPDATE COMPLETE is successfully received by the network, then the network does not know whether UE 101 has received the TAU ACCEPT message or not. As a result, (assume before the TAU procedure the UE does not has assigned IMSI offset value, and during the TAU procedure the network assigns an IMSI offset value to the UE in TAU ACCEPT message) the network does not know whether UE 101 will monitor paging using the paging occasion (paging timing) derived from original IMSI value without offset or monitor paging using the paging occasion (paging timing) derived from IMSI value with offset (i.e., alternative IMSI value). In accordance with one novel aspect, when there is need to page the UE, the network uses two (alternative) IMSI values to determine the paging timing, e.g., the paging occasions for UE 101, until one of the (alternative) IMSI value(s) can be considered as invalid by the network.

Figure 2:
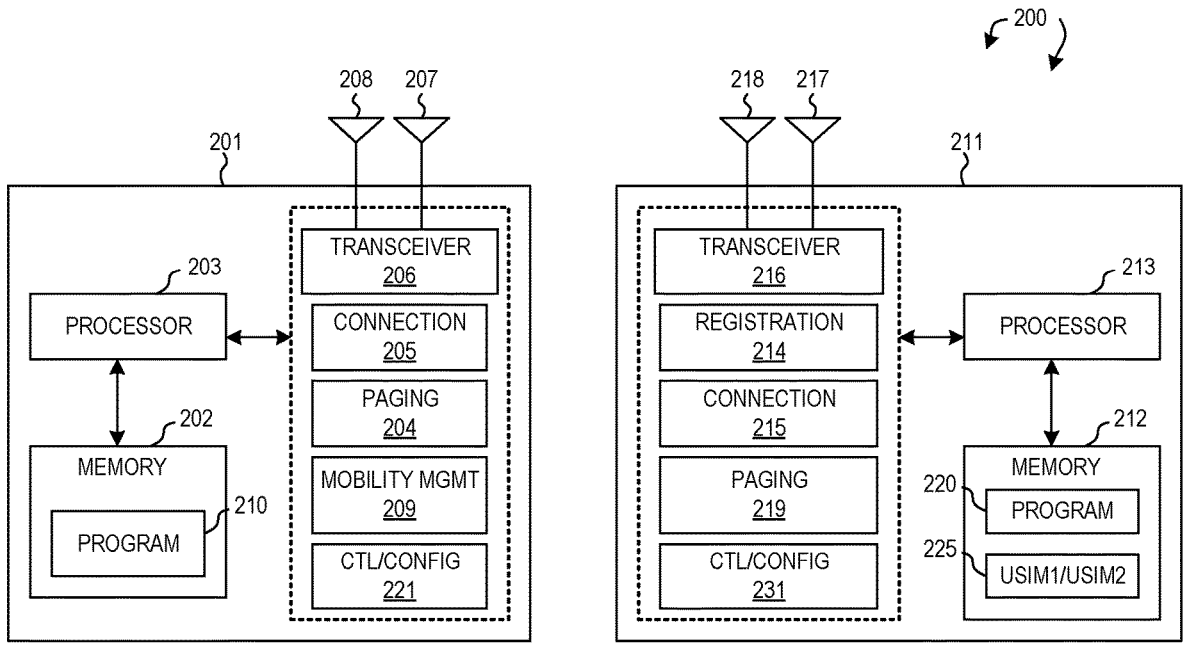
FIG. 2 is a simplified block diagram of a UE and a network entity in accordance with various embodiments of the present invention.

FIG. 2 is a simplified block diagram of wireless devices 201 and 211 in accordance with embodiments of the present invention. For wireless device 201 (e.g., a network entity MME), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in UE 211. Memory 212 stores program instructions and data 220 and multiple USIM cards 225 to control the operations of UE 211.

The wireless devices 201 and 211 also include several functional modules and circuits that can be implemented and configured to perform embodiments of the present invention. In the example of FIG. 2, wireless device 201 is an MME that includes a NAS singling connection handling module 205, a paging module 204, a mobility management module 209, and a control and configuration circuit 221. Wireless device 211 is a UE that includes a connection handling module 215, a registration module 214 (for ATTACH and TAU handling), a paging and mobility handling module 219, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow MME 201 and UE 211 to perform embodiments of the present invention.

In one example, the MME 201 establishes NAS signaling connection with the UE 211 via connection handling circuit 205, pages UEs via paging module 204, performs mobility and handover management via mobility management module 209, and provides control and configuration information to UEs via configuration circuit 221. The UE 211 performs registration with the network via registration module 214, establishes signaling connection via connection handling circuit 215, monitors paging via paging module 219, and obtains configuration information via control and configuration circuit 231. In one example, the MUSIM UE and the network can request and negotiate an IMSI offset for the IMSI value on one of the USIM card through a TAU procedure, so that the paging occasion for that USIM card can be different from the paging occasion for the other USIM card of the same MUSIM UE. In one novel aspect, when lower layer failure occurs during the TAU procedure, the network uses two (alternative) IMSI values to determine the paging timing, e.g., the paging occasions for the MUSIM UE, until one of the (alternative) IMSI values can be considered as invalid by the network.

FIG. 3 illustrates one example of the content of an International Mobile Subscriber Identity (IMSI) that can be used to derive paging occasion. An IMSI includes three components: Mobile Country Code (MCC), Mobile Network Code (MNC), and Mobile Station Identification Number (MSIN). The IMSI is stored in the USIM card and used during the ATTACH and TAU procedure for identification, and for determining paging timing (paging occasion) by the network. A MUSIM UE is a UE with multiple valid USIMs or valid SNPN subscriptions, each capable of initiating and maintaining simultaneous separate registration states over 3GPP access with PLMN(s)/SNPN(s) using identities and credentials associated with those USIMs and supporting one or more of the (N1) NAS signaling connection release, the paging indication for voice services, the reject paging request, the paging timing collision control and the paging restriction. For MUSIM UE, each USIM card has its own IMSI value, and it is possible that the paging occasions for the different USIMs cards determined based on the corresponding IMSI value are the same. As a result, the MUSIM UE that supports "paging timing collision control" needs to indicate an IMSI offset value to the network for one of the USIM card, such that the paging occasion for that USIM card can be changed to a different timing that is different from the paging occasion for the other USIM card of the same MUSIM UE.

For a MUSIM capable UE, if the UE needs to indicate an IMSI offset value to the network, the UE shall include the IMSI offset value in the Requested IMSI offset IE in the ATTACH REQUEST message. If the MUSIM capable UE has included a Requested IMSI offset IE in the ATTACH REQUEST message and if the MME supports paging timing collision control, the MME shall include the Negotiated IMSI offset IE in the ATTACH ACCEPT message. MME shall store the IMSI offset value and use it in calculating an alternative IMSI that is used for deriving the paging occasion. If the MUSIM capable UE has not included a Requested IMSI offset IE in the ATTACH REQUEST message, the MME shall erase any stored alternative IMSI for that UE, if available. If the ATTACH ACCEPT message contains Negotiated IMSI offset IE, the MUSIM capable UE shall forward the IMSI offset value to lower layers. If the ATTACH ACCEPT message does not contain Negotiated IMSI offset IE, the MUSIM capable UE shall indicate to lower layers to erase any IMSI offset value, if available.

Similarly, a tracking area update (TAU) procedure can be initiated by UE and is used to indicate to the network that the MUSIM capable UE needs to use an IMSI Offset value for deriving a different paging occasion. The UE in state EMM-REGISTERED shall initiate the tracking area updating procedure by sending a TRACKING AREA UPDATE REQUEST message to the MME when the MUSIM capable UE needs to request an IMSI Offset value that is used for deriving a different paging occasion. For a MUSIM capable UE, if the UE supports paging timing collision control and needs to indicate an IMSI offset value to the network, the UE shall include the IMSI offset value in the Requested IMSI offset IE in the TRACKING AREA UPDATE REQUEST message. If the MUSIM capable UE has included a Requested IMSI offset IE in the TRACKING AREA UPDATE REQUEST message and if the MME supports paging timing collision control, the MME includes the Negotiated IMSI offset IE in the TRACKING AREA UPDATE ACCEPT message. The MME shall store the IMSI offset value and use it in calculating an alternative IMSI that is used for deriving the paging occasion. If the UE has not included a Requested IMSI offset IE in the TRACKING AREA UPDATE REQUEST message, the MME shall erase any stored alternative IMSI for that UE, if available. If a Negotiated IMSI offset IE is included in the TRACKING AREA UPDATE ACCEPT message, the MUSIM capable UE shall forward the IMSI offset value to lower layers. If a Negotiated IMSI offset IE is not included in the TRACKING AREA UPDATE ACCEPT message, the MUSIM capable UE shall indicate to lower layers to erase any IMSI offset value, if available. If the TRACKING AREA UPDATE ACCEPT message contained a GUTI or a Negotiated IMSI offset IE, the UE shall return a TRACKING AREA UPDATE COMPLETE message to the MME to acknowledge the received GUTI or the received Negotiated IMSI offset IE.

The UE and the network use the Negotiated IMSI offset, also referred to as the Accepted IMSI Offset, to determine the paging occasion (Paging occasion is derived from alternative ISMI value, and the alternative IMSI value is derived from 1. IMSI value and 2. Accepted IMSI Offset value). The UE and MME use the Accepted IMSI Offset to calculate the Alternative IMSI value that is determined based on UE's stored IMSI value as follows: Alternative IMSI value=[MCC][MNC][(MSIN value+Accepted IMSI Offset) mod (MSIN address space)], where the MCC, MNC and MSIN value are the fields of the UE's IMSI as defined in TS 23.003. The MME uses the Alternative IMSI value to compute the UE Identity Index Value. The MME sends the UE Identity Index Value to RAN in the Paging message (see TS 36.413 [36]) for RAN to derive the paging occasions according to TS 36.304 [34]. The UE uses the Alternative IMSI value for the determination of paging occasions as specified in TS 36.304 [34]. If there is no IMSI offset value, then the original IMSI value stored in USIM is used to determine the paging occasion.

FIG. 4 illustrates different cases where the UE and the network using a TAU/ATTACH procedure to request and negotiate IMSI offset values. If a lower layer failure occurs before the message TRACKING AREA UPDATE COMPLETE (or ATTACH COMPLETE) has been received by the network, then there are three different scenarios. Under case #1, in the TRACKING AREA UPDATE ACCEPT (or ATTACH ACCEPT) message, a Negotiated IMSI offset value #1-1 (indicated in the Negotiated IMSI offset IE) has been assigned to a UE, and the UE previously had another Negotiated IMSI offset value #1-2 (indicated in the Negotiated IMSI offset IE) assigned. Under case #2, in the TRACKING AREA UPDATE ACCEPT (or ATTACH ACCEPT) message, no Negotiated IMSI offset value has been assigned to a UE, but the UE previously had Negotiated IMSI offset value #2-1 (indicated in the Negotiated IMSI offset IE) assigned. Under case #3, in the TRACKING AREA UPDATE ACCEPT (or ATTACH ACCEPT) message, a Negotiated IMSI offset value #3-1 (indicated in the Negotiated IMSI offset IE) has been assigned to a UE, but the UE previously had no Negotiated IMSI offset value assigned.

For all three cases, in one scenario, the UE has received the TRACKING AREA UPDATE ACCEPT (or ATTACH ACCEPT) message successfully, but the TRACKING AREA UPDATE COMPLETE (or ATTACH COMPLETE) is not delivered to the network. Therefore, the UE will use the updated (alternative) IMSI value (i.e., for case #1: IMSI offset value #1-1 is taken into account to determine the paging occasion; for case #2: No IMSI offset value is taken into account to determine the paging occasion; for case #3: IMSI offset value #3-1 is taken into account to determine the paging occasion) after the TAU/ATTACH procedure. Note that the updated (alternative) IMSI value is also referred to as an updated IMSI parameter. In another scenario, the UE has not received the TRACKING AREA UPDATE ACCEPT (or ATTACH ACCEPT) message, and therefore the UE will use the previous (alternative) IMSI value before the TAU/ATTACH procedure (i.e., for case #1: IMSI offset value #1-2 is taken into account to determine the paging occasion; for case #2: IMSI offset value #2-1 is taken into account to determine the paging occasion; for case #3: No IMSI offset value is taken into account to determine the paging occasion). Note that the previous (alternative) IMSI value is also referred to as a previous IMSI parameter.

For Case #1, UE may use either IMSI offset value #1-1 or IMSI offset value #1-2 to derive paging occasion, and NW cannot be sure what value UE uses. For Case #2, UE may use either IMSI offset value #2-1 or IMSI value stored in the USIM to derive paging occasion, and NW cannot be sure what value UE uses. For Case 3), UE may use IMSI offset value #3-1 or IMSI value stored in the USIM to derive paging occasion, and NW cannot be sure what value UE uses. Accordingly, the network needs to consider both possible (alternative) IMSI values the UE is possibly using, when deriving paging timing for the UE.

Figure 5:
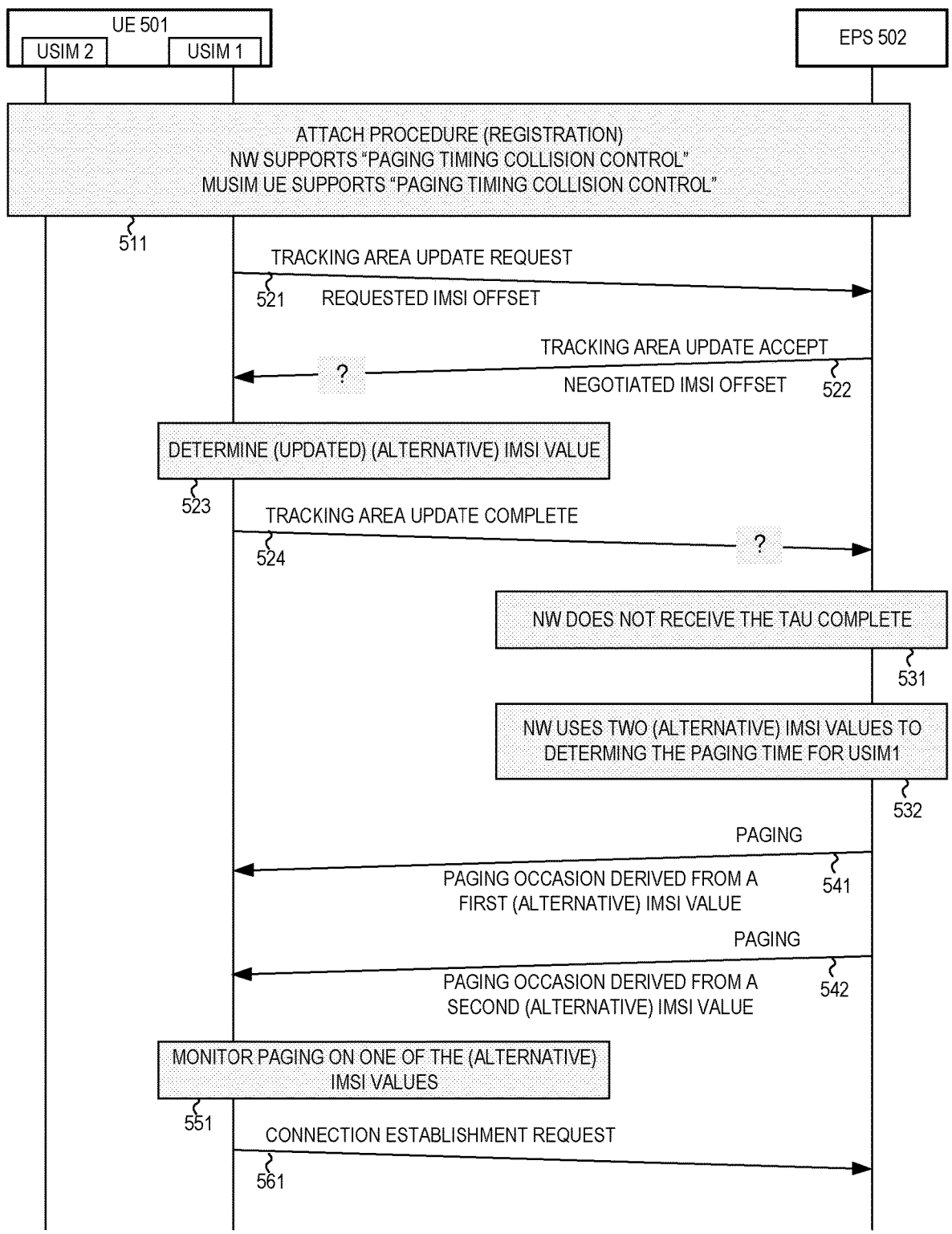
FIG. 5 illustrates one embodiment of handling IMSI offset value for MUSIM UEs supporting paging timing collision control in an EPS network in accordance with one novel aspect.

FIG. 5 illustrates one embodiment of handling IMSI offset value for MUSIM UEs supporting paging timing collision control in an EPS network in accordance with one novel aspect. UE 501 is a MUSIM UE, which is defined as a UE with multiple valid USIMs. In step 511, UE 501 performs attach procedure with the EPS network 502 for both USIM1 and USIM2. USIM1 stores an original IMSI1 value and USIM2 stores an original IMSI2 value. IMSI1 and IMSI2 are used for deriving paging timing, e.g., paging occasions. At certain time, UE 501 discovers that the paging occasions derived from the IMSI1 and IMSI2 for USIM1 and USIM2 are the same, hence UE 501 will not be able to monitor paging for both USIM cards. Since UE 501 and EPS 502 supports paging timing collision control, UE 501 can use TAU procedure to request an IMSI offset value for one of the USIM cards, e.g., for USIM1.

In step 521, UE 501 sends a TRACKING AREA UPDATE REQUEST message to EPS 502 over USIM1. The TRACKING AREA UPDATE REQUEST message includes a UE requested IMSI offset for USIM1. In step 522, EPS 502 sends a TRACKING AREA UPDATE ACCEPT message back to UE 501. The TRACKING AREA UPDATE ACCEPT message includes a NW accepted (negotiated) IMSI offset for USIM1. However, due to low layer failure, the TRACKING AREA UPDATE ACCEPT message may not be received by UE 501. If that is the case, then UE 501 continue to use the previous IMSI value, without applying the IMSI offset. UE 501 will not send a TRACKING AREA UPDATE COMPLETE message to the network. On the other hand, if UE 501 successfully receives the TRACKING AREA UPDATE ACCEPT message, then in step 523, UE 501 will apply the negotiated IMSI offset in deriving the paging occasion for USIM1. In addition, in step 524, UE 501 sends a TRACKING AREA UPDATE COMPLETE message to EPS 502. However, due to low layer failure, the TRACKING AREA UPDATE COMPLETE message is not successfully received by EPS 502 (step 531).

Accordingly, in step 532, the MME of EPS 502 needs to consider both possible IMSI values to determine the paging timing for USIM1. As illustrated earlier with respect to FIG. 4, under all three different cases, the UE may use two (alternative) IMSI values to derive the paging occasions and the network does not know which (alternative) IMSI value the UE uses. In the embodiment of FIG. 5, in step 541, the MME sends a paging to UE 501, using the previous IMSI value (e.g., before the TAU procedure) for deriving the paging occasion. In step 542, the MME sends a paging to UE 501, using the updated IMSI value (e.g., assuming successful TAU procedure) for deriving the paging occasion. In step 551, UE 501 monitors paging using one of the (alternative) IMSI values, depending on the different cases. In step 561, UE 501 tries to establish a connection with the network in response to the paging. Because the network uses two (alternative) IMSI values to determine the paging timing for USIM1, the UE is able to receive the paging on USIM1 no matter which (alternative) IMSI value the UE uses to monitor the paging occasion.

Figure 6:
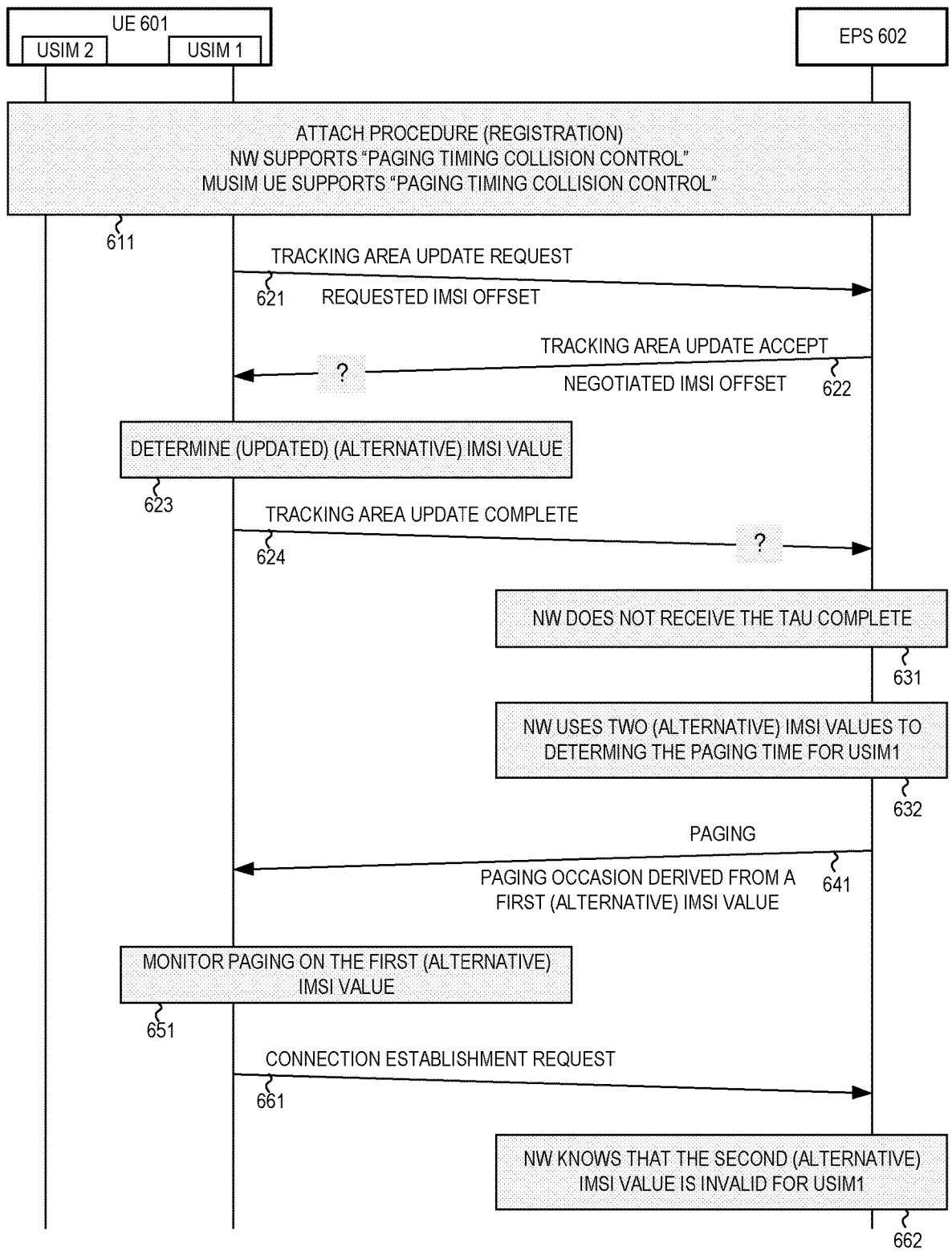
FIG. 6 illustrates another embodiment of handling IMSI offset value for MUSIM UEs supporting paging timing collision control in an EPS network in accordance with one novel aspect.

FIG. 6 illustrates another embodiment of handling IMSI offset value for MUSIM UEs supporting paging timing collision control in an EPS network in accordance with one novel aspect. The steps from 611 to 632 in FIG. 6 are similar to the steps 511 to 532 in FIG. 5. However, in the embodiment of FIG. 6, the network uses two (alternative) IMSI values to determine the paging timing for USIM1, until one of the values can be considered as invalid by the network. In step 641, the network sends a paging to UE 502, using a first (alternative) IMSI value for determine the paging timing. In step 651, UE 601 monitors paging using the first (alternative) IMSI value and is able to receive the paging. In step 661, UE 601 tries to establish a connection with the network in response to the paging. As a result, the network knows that the second (alternative) IMSI value is invalid, and the network can continue to use the first (alternative) IMSI value to page the UE on USIM1 (step 662). On the other hand, if the UE does not respond to the paging using the first IMSI value e.g., after a certain amount of time, then the network may switch to paging using the second (alternative) IMSI value for determining the paging timing. If the UE responds to the paging, then the network knows that the first (alternative) IMSI value is invalid, and the network can continue to use the second (alternative) IMSI value to page the UE on USIM1.

In one alternative embodiment, the network assigns a new GUTI when the alternative IMSI value is changed or deleted. The network can consider the alternative IMSI value associated with the old GUTI as invalid if the UE responds to the paging with the new GUTI. Similarly, the network can consider the alternative IMSI value associated with the new GUTI as invalid if the UE responds to the paging with the old GUTI.

Figure 7:
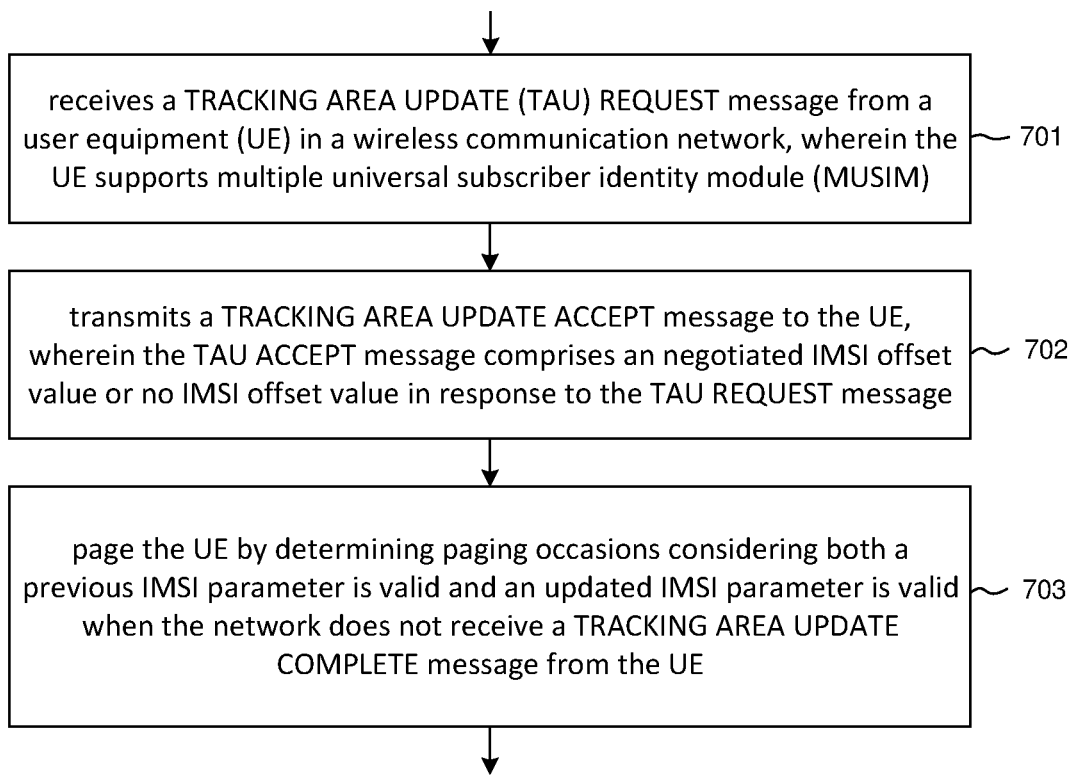
FIG. 7 is a flow chart of a method of handling IMSI value for MUSIM UEs supporting paging timing collision control in an EPS network in accordance with one novel aspect of the present invention.

FIG. 7 is a flow chart of a method of handling IMSI value for MUSIM UEs supporting paging timing collision control in an EPS network in accordance with one novel aspect of the present invention. In step 701, a network entity receives a TRACKING AREA UPDATE (TAU) REQUEST message from a user equipment (UE) in a wireless communication network. The UE supports multiple universal subscriber identity module (MUSIM). In step 702, the network entity transmits a TRACKING AREA UPDATE ACCEPT message to the UE. The TAU ACCEPT message comprises a negotiated IMSI offset value or no IMSI offset value in response to the TAU REQUEST message. In step 703, the network entity pages the UE by determining paging occasions considering both a previous IMSI parameter is valid and an updated IMSI parameter is valid when the network does not receive a TRACKING AREA UPDATE COMPLETE message from the UE.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving, by a network entity, a TRACKING AREA UPDATE (TAU) REQUEST message from a user equipment (UE) with a previous IMSI parameter in a wireless communication network;
   transmitting a TRACKING AREA UPDATE ACCEPT message to the UE, wherein the TAU ACCEPT message comprises a negotiated IMSI offset value or no IMSI offset value in response to the TAU REQUEST message; and
   paging the UE by determining paging occasions considering both the previous IMSI parameter is valid and an updated IMSI parameter is valid when the network does not receive a TRACKING AREA UPDATE COMPLETE message from the UE, wherein the updated IMSI parameter is based on the negotiated IMSI offset value or no IMSI offset value in the TRACKING AREA UPDATE ACCEPT message.

2. The method of claim 1, wherein the network and the UE support paging timing collision control.

3. The method of claim 1, wherein the previous IMSI parameter is an alternative IMSI value or an original IMSI value stored in the USIM card before the network transmitting the TRACKING AREA UPDATE ACCEPT message.

4. The method of claim 1, wherein the updated IMSI parameter is an alternative IMSI value after the network applies the negotiated IMSI offset value sent in the TAU ACCEPT message or an original IMSI value stored in the USIM card when no IMSI offset value is included in the TAU ACCEPT message.

5. The method of claim 1, wherein the previous IMSI parameter is a first alternative IMSI value derived from a first negotiated IMSI offset value, and the updated IMSI parameter is a second alternative IMSI value derived from the negotiated IMSI offset value included in the TAU ACCEPT message.

6. The method of claim 1, wherein the previous IMSI parameter is an alternative IMSI value derived from a first negotiated IMSI offset value, and the updated IMSI parameter is an original IMSI value stored in the USIM card when there is no IMSI offset value included in the TAU ACCEPT message.

7. The method of claim 1, wherein the previous IMSI parameter is an original IMSI value stored in the USIM card, and the updated IMSI parameter is an alternative IMSI value derived from the negotiated IMSI offset value included in the TAU ACCEPT message.

8. The method of claim 1, wherein the network pages the UE using determined paging occasions derived from the previous IMSI parameter or the updated IMSI parameter or both, until one of the IMSI parameters is considered invalid.

9. The method of claim 8, wherein the network considers one IMSI parameter as invalid if the network receives a paging response from the UE when the network pages the UE using paging occasions derived from the other IMSI parameter.

10. The method of claim 1, wherein the network does not receive the TAU COMPLETE message from the UE due to a low layer failure occurs before the TAU COMPLETE message is received by the network.

11. A network entity, comprising:
    a receiver that receives a TRACKING AREA UPDATE (TAU) REQUEST message from a user equipment (UE) with a previous IMSI parameter in a wireless communication network;
    a transmitter that transmits a TRACKING AREA UPDATE ACCEPT message to the UE, wherein the TAU ACCEPT message comprises a negotiated IMSI offset value or no IMSI offset value in response to the TAU REQUEST message; and a paging handling circuit that pages the UE by determining paging occasions considering both the previous IMSI parameter is valid and an updated IMSI parameter is valid when the network does not receive a TRACKING AREA UPDATE COMPLETE message from the UE, wherein the updated IMSI parameter is based on the negotiated IMSI offset value or no IMSI offset value in the TRACKING AREA UPDATE ACCEPT message.

12. The network entity of claim 11, wherein the network and the UE support paging timing collision control.

13. The network entity of claim 11, wherein the previous IMSI parameter is an alternative IMSI value or an original IMSI value stored in the USIM card before the network transmitting the TRACKING AREA UPDATE ACCEPT message.

14. The network entity of claim 11, wherein the updated IMSI parameter is an alternative IMSI value after the network applies the negotiated IMSI offset sent in the TAU ACCEPT message or an original IMSI value stored in the USIM card when no IMSI offset value is included in the TAU ACCEPT message.

15. The network entity of claim 11, wherein the previous IMSI parameter is a first alternative IMSI value derived from a first negotiated IMSI offset value, and the updated IMSI parameter is a second alternative IMSI value derived from the negotiated IMSI offset value included in the TAU ACCEPT message.

16. The network entity of claim 11, wherein the previous IMSI parameter is an alternative IMSI value derived from a first negotiated IMSI offset value, and the updated IMSI parameter is an original IMSI value stored in the USIM card when there is no IMSI offset value included in the TAU ACCEPT message.

17. The network entity of claim 11, wherein the previous IMSI parameter is an original IMSI value stored in the USIM card, and the updated IMSI parameter is an alternative IMSI value derived from the negotiated IMSI offset value included in the TAU ACCEPT message.

18. The network entity of claim 11, wherein the network pages the UE using determined paging occasions derived from the previous IMSI parameter or the updated IMSI parameter or both, until one of the IMSI parameters is considered invalid.

19. The network entity of claim 18, wherein the network considers one IMSI parameter as invalid if the network receives a paging response from the UE when the network pages the UE using paging occasions derived from the other IMSI parameter.

20. The network entity of claim 11, wherein the network does not receive the TAU COMPLETE message from the UE due to a low layer failure occurs before the TAU COMPLETE message is received by the network.

* * * * *